US006678578B2

(12) United States Patent
Holmen et al.

(10) Patent No.: US 6,678,578 B2
(45) Date of Patent: Jan. 13, 2004

(54) DEVICE FOR HANDLING LIQUID CONTAINERS

(75) Inventors: Kristian Holmen, Asker (NO); Jacob Sømming Rognhaug, Oslo (NO); Jan Rype, Asker (NO)

(73) Assignee: Tomra Systems ASA, Asker (NO)

( * ) Notice: Subject to any disclaimer, the term of this patent is extended or adjusted under 35 U.S.C. 154(b) by 0 days.

(21) Appl. No.: 10/333,396

(22) PCT Filed: Aug. 1, 2001

(86) PCT No.: PCT/NO01/00329

§ 371 (c)(1),
(2), (4) Date: Jan. 17, 2003

(87) PCT Pub. No.: WO02/12095

PCT Pub. Date: Feb. 14, 2002

(65) Prior Publication Data

US 2003/0187546 A1 Oct. 2, 2003

(30) Foreign Application Priority Data

Aug. 4, 2000 (NO) .......................................... 20003976

(51) Int. Cl.[7] .......................... G06F 7/00; B65G 43/08; B65G 47/24; B07C 5/00; B07C 5/02

(52) U.S. Cl. ....................... 700/223; 700/225; 198/395; 198/570.07; 209/524; 209/538; 209/583; 209/587

(58) Field of Search ................................ 700/223, 225, 700/230; 198/379, 395, 570.07; 209/524, 538, 540, 583, 587

(56) References Cited

U.S. PATENT DOCUMENTS 4,433,785 A * 2/1984 Riggs et al. ................ 209/538
4,483,435 A 11/1984 Ionescu
5,161,661 A * 11/1992 Hammond .................. 209/524
5,434,428 A 7/1995 Paladini
5,439,093 A 8/1995 Drewitz
5,934,440 A 8/1999 Kroghrud
6,431,343 B1 * 8/2002 Lehtola et al. .............. 198/395

FOREIGN PATENT DOCUMENTS

DE 19724666 A1 12/1997

* cited by examiner

*Primary Examiner*—Gene O Crawford
(74) *Attorney, Agent, or Firm*—Rodman & Rodman

(57) ABSTRACT

Handling of liquid containers in horizontal position in the form of beverage packaging, for example, cans or or bottles of any cross-section, comprising a first and a second conveyor with respective belt, especially in connection with detection of features of the container. The belts are movable in a mutually parallel direction, and in a first, container-supporting position form an angle relative to each other, thereby forming an approximately V-shaped conveyor. The two conveyors can be moved apart to a second position thereof, thereby exposing in the space between the conveyor belts a pair of rotary rollers which have the same direction of rotation and having their axis of rotation in the direction of travel of the conveyor belts, whereby a container that is supported by the conveyor belts falls onto the pair of rollers and is rotated there in order to detect with the aid of a detector unit characteristic features of the container, for example, its contour, an identification code or the like, and means for moving the two conveyor belts from the second position back to the first position, whereby a container that is rotated on the rollers is lifted up and away from the rollers by the conveyor belts for support by the conveyor belts in said first position. The container may in said first position of the conveyors be caused either to be carried onwards to a point downstream in relation to the conveyors or be carried back to an upstream position.

3 Claims, 3 Drawing Sheets

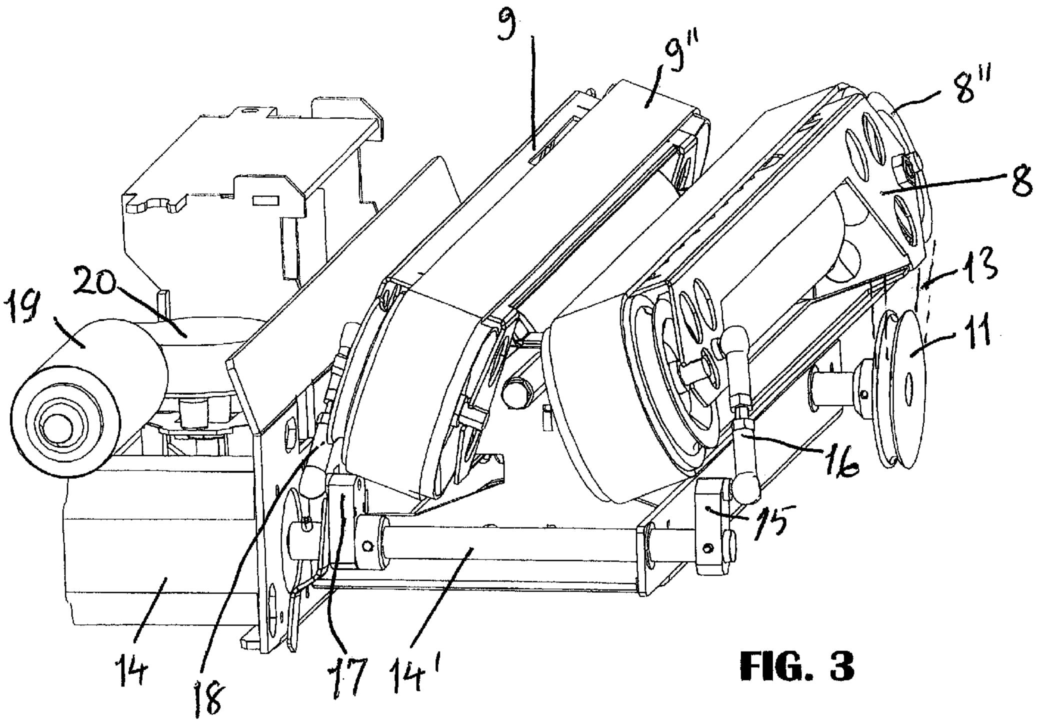
FIG. 3
FIG. 4
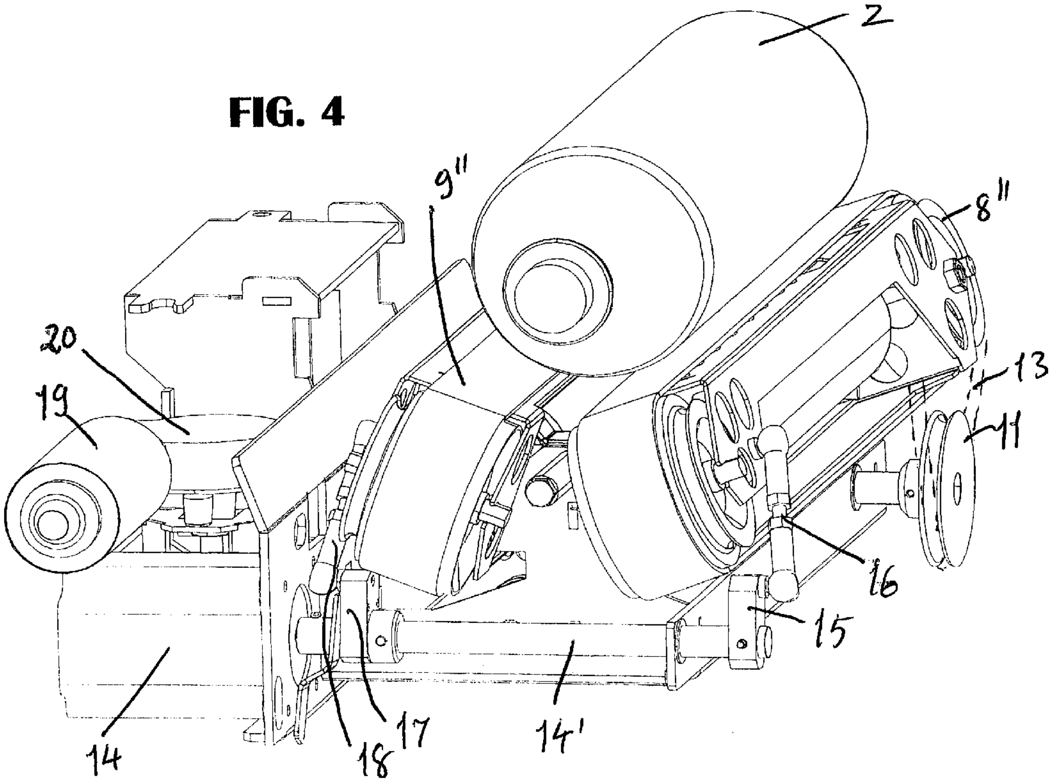

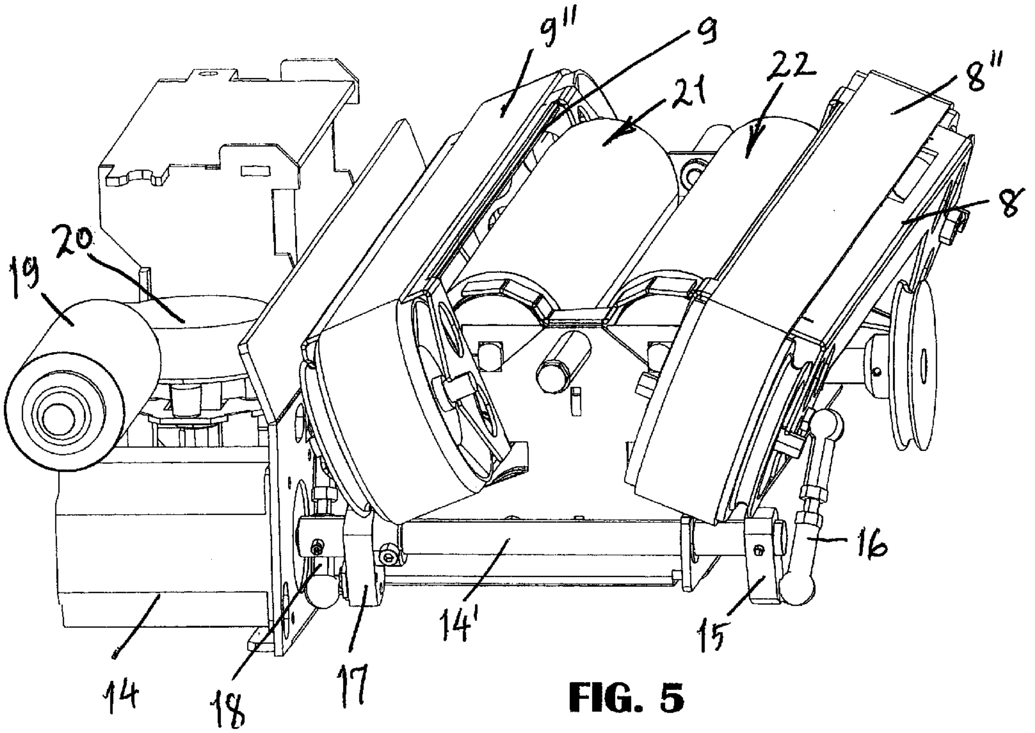
FIG. 5
FIG. 6
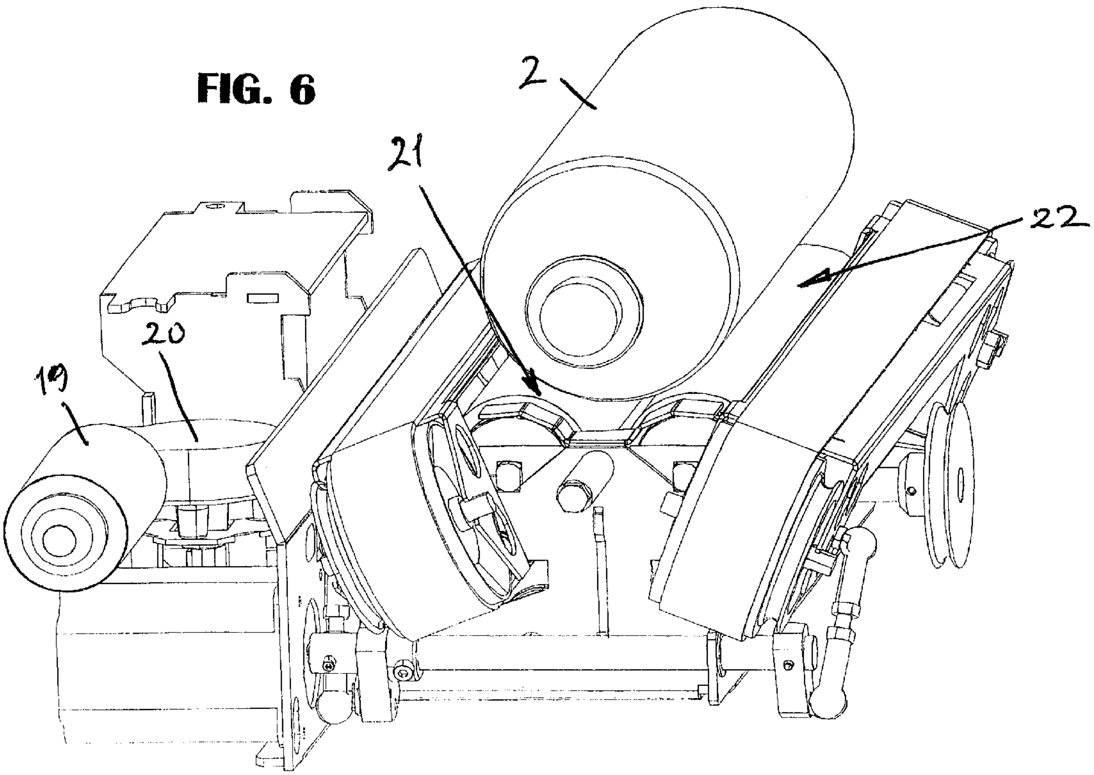

DEVICE FOR HANDLING LIQUID CONTAINERS

The present invention relates to a method and apparatus for handling liquid containers in the form of empty beverage packaging in a horizontal position, for example, cans or bottles of any cross-section, in connection with the detection of characteristic features of the container, where the method comprises:

a) placing the container on a conveyor, where the conveyor belts of the conveyor together form an approximate V-shape in cross-section, b) detecting the contour of the container by means of a container-detecting unit, and c) determining whether there is a visible identification code on the container or not, and where the apparatus comprises: a first and second conveyor with respective belt structure, where the belts are movable in a mutually parallel direction, and in a first, container-supporting position form an angle relative to one another, thereby forming an approximate V-shaped conveyor.

An apparatus for conveying and optionally rotating liquid containers in a horizontal position, for example, empty beverage packaging in the form of cans or bottles of any cross-section, is already known.

In connection with an apparatus of this kind, it has been known to lift the liquid container up from the conveyor and to rotate the container by using rotary rollers in order to detect in the best possible way characteristics of the liquid container such as marker codes, for example, bar codes etc. If a liquid container at the point of examination was found not to satisfy certain criteria, a superjacent channel having an inverted U-shaped would be made to carry the liquid container away from the rotary rollers, whilst a liquid container for onward conveying would be lowered onto the conveyor again and optionally conveyed onwards.

The aforementioned solution is both complicated and unsuitable for the examination of cans or bottles having an irregular cross-section.

It has therefore been an object of the present invention to provide an improved apparatus that is mechanically simpler, but at the same times permits the examination of cans or bottles having any and substantially different cross-sections.

According to the invention, the method is characterised by d) if an identification code is visible, detecting the code by means of a code detector, and then carrying out steps f) or g), or e) if an identification code is not visible, moving the conveyor belts apart so as to drop the container onto a pair of rotary rollers for rotation of the container until an identification code on the container becomes visible to the code detector and is detected thereby, whereupon the conveyor belts are brought together to form the said V-shape and thus lift the container up from the rotary rollers, and then carrying out steps f) or g), wherein step f) comprises carrying the container onwards on the conveyor to a point downstream in relation to the conveyor; and step g) comprises carrying the container on the conveyor back to an upstream position or insertion position.

According to the invention the apparatus is characterised by:

means for moving the two conveyors apart to a second position thereof, thereby exposing in the space between the conveyor belts a pair of rotary rollers that have the same direction of rotation and whose axis of rotation lies in the direction of travel of the conveyor belts, whereby a container supported by the conveyor belts in the first position falls onto the pair of rollers and is rotated there;

a detector unit adapted to detect characteristic features of the container, for example, its contour, an identification code or the like, during the rotation of the container; and means for moving the two conveyors from the second position back to the first position, whereby the container that it rotated on the rollers is lifted up and away from the rollers by the conveyor belts for support by the conveyor belts in said first position.

According to a further embodiment of the apparatus, the container in said first position of the conveyors will either be carried onwards to a point downstream in relation to the conveyor, or be caused to be carried back to the upstream position.

The invention will now be explained in more detail with reference to the attached drawings which show a preferred exemplary embodiment of the apparatus according to the invention.

FIGS. 3 and 4 show the apparatus according to the invention in a first position, and without and with a liquid container placed thereon respectively.

FIGS. 5 and 6 show the apparatus according to the invention in at second working position thereof, and without and with a liquid container placed thereon respectively.

Figure 1:
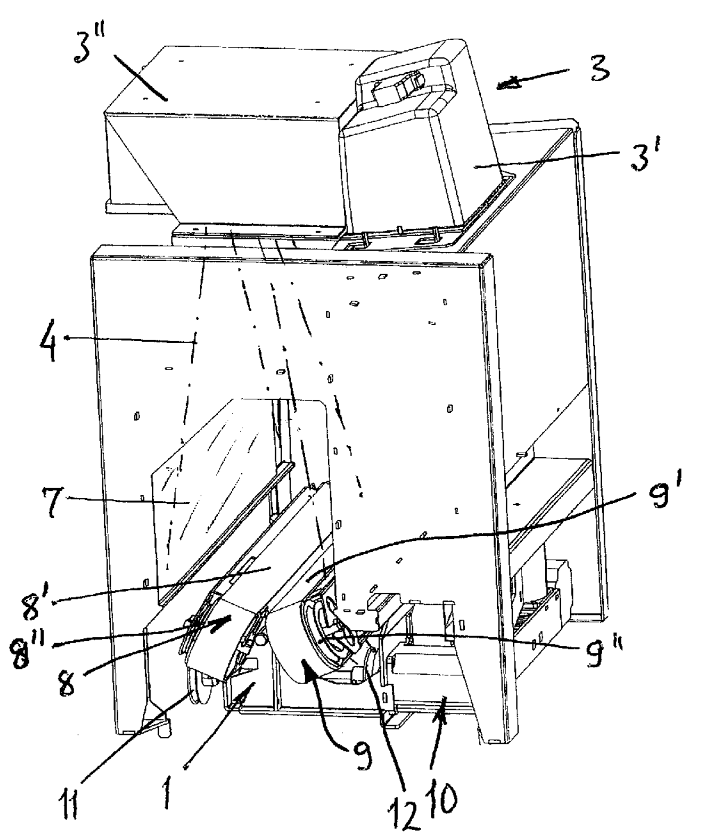
FIGS. 1 and 2 are two different perspective views of the apparatus according to the invention.
Figure 2:
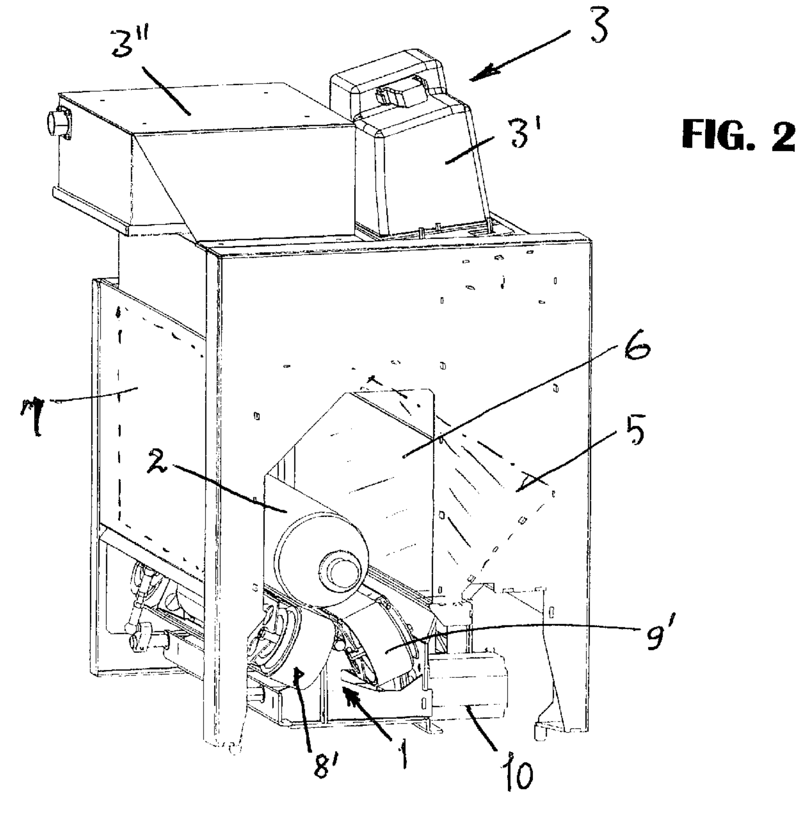

In FIGS. 1 and 2 the conveying part of the apparatus is indicated by the reference numeral 1 and is intended for the conveyance of liquid container 2 in a horizontal position. Such liquid containers may, for example, be cans or bottles of any cross-section and not necessarily a circular cross-section. The apparatus is provided with a detector unit 3, for example, consisting of a container contour detecting unit 3' and a detector 3" for detecting characteristic marks on the container, for example, a bar code. The detector 3" may, for example, have a detection field as indicated by the broken lines 4. The detector 3' can, for detection of the container contour, make use, for example, of light that is transmitted towards an inclined mirror 5, for example, inclined at 45° relative to the horizontal and which is reflected via a Fresnel lens 6, so that the light which passes through the lens 6 will pass as parallel light transverse to the path of travel of the container 2 and the light that is not shielded by the container 2 will be reflected by a reflector 7 back through the lens 6 and via the mirror 5 to a detector part of the detector 3', such as a camera. The light emitted by the detector 3 and which is partly reflected, may for example come form a point source such as a light-emitting diode. The conveying apparatus itself consists of a first conveyor 8 and a second conveyor 9 having respective belts 8' and 9'. As can be seen from the figures, the belts 8' and 9' are movable in a mutually parallel direction and in a first, container-supporting position, as shown in FIGS. 1, 2, 3 and 4, the belts 8', 9' form an angle relative to one another so that the two conveyor belts together form an approximately V-shaped conveyor.

The apparatus has a motor unit 10 that provides the drive of the conveyors 8, 9 via pulleys 11, 12 that move the conveyor belts 8', 9' via pulleys 8" and 9" on the conveyors 8, 9 at one end thereof. The belt is indicated schematically by the reference numeral 13 in FIGS. 3 and 4.

As shown in more detail in FIGS. 3–6, there are means for moving the two conveyors 8, 9 apart to a second position thereof, this second position being shown in FIGS. 5 and 6.

To be able to move the conveyors apart into this second position, there is provided a motor 14 that is connected to a shaft 14' and via an articulation 15, 16 and 17, 18 which controls the tilting movement of the conveyors 8, 9. When the shaft 14' turns, the arm 15 will actuate the end position of an arm 16 which at one end is articulated to the conveyors 8 and at the other end is articulated to the arm 15. This applies also to the arms 17, 18 in connection with the articulation formed thereby.

In addition to the said motors 10, 14, there is also provided a further motor 19 which via a gear 20 forms a connection with a pair of rotary rollers 21, 22. The connection may, for example, be via a worm drive and belt transmission or other appropriate transmission of forces from the motor 19.

The rotary rollers 21, 22 will necessarily have the same direction of rotation and can either rotate, as seen in FIGS. 5 and 6, in a clockwise direction of rotation or in the reverse direction. However it will be seen that the rotary rollers 21, 22 have respective axes of rotation in the direction of travel of the conveyor belts 8', 9'.

When the motor 14 via the shaft 14' and the articulations 15, 16 and 17, 18, causes the conveyors 8, 9 to tilt sideways away from one another, the container 2 that is supported by the belts 8', 9' will ultimately, in the second position of the conveyors 8, 9, no longer be supported by their respective belts 8', 9', but the rotary rollers 21, 22. The rollers 21, 22 are brought to said rotation by the motor 19 and the connection that the rollers 21, 22 have with the motor via, for example, a worm drive and belt transmission and via the gear 20.

When the rollers 21, 22 are caused to rotate, the detectors 3', 3" in the detector unit 3 will be able to detect characteristic features of the container such as the container contour, identification code or the like.

Once the container 2 has been rotated and identified, the motor 14 will again enter into operation to move the conveyors 8, 9 from the second position as shown in FIGS. 5 and 6 back to the first position which is shown in FIGS. 3 and 4. Thus, it will be appreciated that the container 2 rotated on the rollers 21, 22 is lifted up and away from the rollers by the conveyor belts 8', 9' for support by the conveyor belts in their first position.

As the container is now positioned on the conveyors in their first position, the container will either be carried onwards to a point downstream in relation to the conveyors or be caused to be carried back to an upstream position. In a downstream position the container can be carried to a sorting mechanism where the container is caused to be pushed away sideways by means of a carrying-away mechanism.

However, it is conceivable that it is not necessarily required to lower the container onto the rotary rollers. This may especially be the case if the identification code, for example, a bar code, on the container is visible to a code detector as soon as the container is fed in by the conveyor and is seen by the code detector. In such a case, and provided that the container contour is also detectable, the identification code, for example, a bar code, will be detected directly and then the container will either be carried onwards on the conveyor to a point downstream in relation to the conveyor, or carried by the conveyor back to an upstream position or the insertion position of the container.

However, if an identification code on the container is not immediately visible to the code detector, such as the detector 3" as previously described, the conveyor belts will be moved apart so as to drop the container onto the rotary rollers and to rotate the container until the identification code is visible to the code detector and is detected thereby, whereupon the conveyor belts are brought together again to form the said V-shape and thus lift the container up from the rotary rollers. Then the container can either be carried onwards on the conveyor to a point downstream in relation to the conveyor, or carried back to an upstream position of the insertion position of the container. If the container is moved back to the upstream position, this may mean, for example, that the container is in any case not acceptable or does not generate a deposit refund. In a purely exceptional case, if a container is very large in size it may be expedient to move the conveyor belts apart to lower the container, so that its contour can also more easily be detected with certainty by the container-detecting unit 3'.

What is claimed is:

1. A method for handling liquid containers in a horizontal position in the form of empty beverage packaging, for example cans or bottles of any cross-section, in connection with the detection of characteristic features of the container, comprising:

a) placing the container on a conveyor, where the conveyor belts of the conveyor together form an approximate V-shape in cross-section;

b) detecting the contour of the container by means of a container-detecting unit;

c) determining whether there is a visible identification code on the container or not; characterised by d) if an identification code is visible, detecting the code by means of a code detector, and then carrying out step f) or g), e) if an identification code is not visible, moving the conveyor belts apart so as to drop the container onto a pair of rotary rollers for rotation of the container until an identification code on the container becomes visible to the code detector and is detected thereby, whereupon the conveyor belts are brought together to form the said V-shape and thus lift the container up from the rotary rollers, and then carrying out step f) or g), and wherein step f) comprises conveying the container onwards on the conveyor to a point downstream in relation to the conveyor; and step g) comprises conveying the container on the conveyor back to an upstream position or insertion position.

2. An apparatus for handling liquid containers in a horizontal position in the form of empty beverage packaging, for example cans or bottles of any cross-section, in connection with the detection of characteristic features of the container, comprising a first and second conveyor having respective belt structure, where the belts are movable in a mutually parallel direction, and in a first, container-supporting position form an angle relative to one another, thereby forming an approximate V-shaped conveyor, characterised by means for moving the two conveyors apart to a second position thereof, thereby exposing in the space between the conveyor belts a pair of rotary rollers that have the same direction of rotation and whose axis of rotation lies in the direction of travel of the conveyor belts, whereby a container supported by the conveyor belts in the first position falls onto the pair of rollers and is rotated;

a detector unit adapted to detect characteristic features of the container, for example, its contour, an identification code or the like, when the container is rotated; and means for moving the two conveyors from the second position back to the first position, whereby the container that is rotated on the rollers is lifted up and away from the rollers by the conveyor belts for support by the conveyor belts in said first position.

3. An apparatus as disclosed in claim 2, characterised in that the apparatus is in a first position of the conveyors adapted to:

either carry the container onwards to a point downstream in relation to the conveyor;

or to cause the container to be carried back to an upstream position.

* * * * *